(12) United States Patent
Matsumoto

(10) Patent No.: US 6,466,759 B1
(45) Date of Patent: Oct. 15, 2002

(54) DEVELOPING DEVICE, PROCESS CARTRIDGE WITH DEVELOPER BLOCKING MEMBER, AND ELECTROPHOTOGRAPHIC IMAGE FORMING APPARATUS USING THE SAME

(75) Inventor: Hideki Matsumoto, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/691,173

(22) Filed: Oct. 19, 2000

(30) Foreign Application Priority Data

Oct. 26, 1999 (JP) .......................... 11-303860
Sep. 27, 2000 (JP) ...................... 2000-294834

(51) Int. Cl.⁷ ............................................. G03G 15/09
(52) U.S. Cl. ...................................................... 399/274
(58) Field of Search ................................ 399/119, 120, 399/252, 265, 267, 274, 284, 285, 111

(56) References Cited

U.S. PATENT DOCUMENTS

| | | | |
|---|---|---|---|
| 4,780,741 A | * 10/1988 | Wada et al. | 399/274 |
| 5,946,522 A | 8/1999 | Inami | 399/27 |
| 6,058,284 A | 5/2000 | Okano et al. | 399/284 |

FOREIGN PATENT DOCUMENTS

| | | |
|---|---|---|
| JP | 53-108440 | 9/1978 |
| JP | 57-37380 | 3/1982 |
| JP | 59-231563 | 12/1984 |
| JP | 60-95571 | 5/1985 |
| JP | 11-161010 | 6/1999 |

* cited by examiner

Primary Examiner—Sophia S. Chen
Assistant Examiner—Hoan Tran
(74) Attorney, Agent, or Firm—Fitzpatrick, Cella, Harper & Scinto

(57) ABSTRACT

A developing device for developing an electrostatic latent image formed on electrophotographic photosensitive member includes a developer accommodating portion for accommodating a magnetic developer and a developing roller for developing with the developer the electrostatic latent image formed on the electrophotographic photosensitive member. The developing roller contains therein a magnetic flux generating member, which is effective to generate a magnetic force by which the developer is carried on a peripheral surface of the developing roller. The device also includes a developer regulating member for regulating an amount of the developer carried on the peripheral surface of the developing roller and a blocking member for blocking the developer from entering such a side of the developer regulating member as is opposite from the developer roller.

23 Claims, 10 Drawing Sheets

DEVELOPING DEVICE, PROCESS CARTRIDGE WITH DEVELOPER BLOCKING MEMBER, AND ELECTROPHOTOGRAPHIC IMAGE FORMING APPARATUS USING THE SAME

FIELD OF THE INVENTION AND RELATED ART

The present invention relates to a developing device, a process cartridge and an electrophotographic image forming apparatus.

The electrophotographic image forming apparatus forms an image on a recording material through an electrophotographic image formation type process. Examples of the electrophotographic image forming apparatus include an electrophotographic copying machine, an electrophotographic printer (a laser beam printer or LED printer mountable), a facsimile machine, a word processor and the like.

The process cartridge integrally contains an electrophotographic photosensitive drum, and charging means, developing means or cartridge, in the form of a unit or a cartridge, which is detachably mountable to a main assembly of an image forming apparatus. The process cartridge may contain the electrophotographic photosensitive drum, and at least one of charging means, developing means and cleaning means, in the form of a cartridge which is detachably mountable to the main assembly of the image forming apparatus. Furthermore, the process cartridge may contain at least the electrophotographic photosensitive drum and the developing means.

The developing device includes a developing means and a developer accommodating portion, and develops an electrostatic latent image formed on an electrophotographic photosensitive member with a developer by a developing means into a visualized image.

More particularly, in a known electrophotographic image forming apparatus image an image is formed on a recording material through an electrophotographic image forming process, there is provided a developing device having a developer accommodating portion and developing means, wherein an electrostatic latent image formed on an electrophotographic photosensitive member is developed by the developing means of the developing device with developer (toner) into a visualized toner image.

In such a developing device and a process cartridge, it is desirable that developer accommodated in the developer accommodating portion is efficiently used, that is, is used up. From this standpoint, the present inventor has noted the developer remaining on a backside of a developer regulating member (developing blade).

SUMMARY OF THE INVENTION

Accordingly, it is a principal object of the present invention to provide a developing device, a process cartridge using the developing device and an electrophotographic image forming apparatus using the same in which the amount of the developer remaining in a developing device is reduced.

It is another object of the present invention to provide a process cartridge and an electrophotographic image forming apparatus to which the process cartridge detachably mountable in which the amount of the developer remaining in the process cartridge is reduced.

It is a further object of the present invention to provide a developing device, a process cartridge and an electrophotographic image forming apparatus in which the developer can be used efficiently.

It is a further object of the present invention to provide a developing device, a process cartridge and an electrophotographic image forming apparatus in which the developer is prevented from entering a region which is opposite from a region where a developer regulating member is opposed to a developing roller.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

The description will be made as to the embodiments of the present intention in conjunction with the accompaniment drawings.

Embodiment 1

Figure 1:
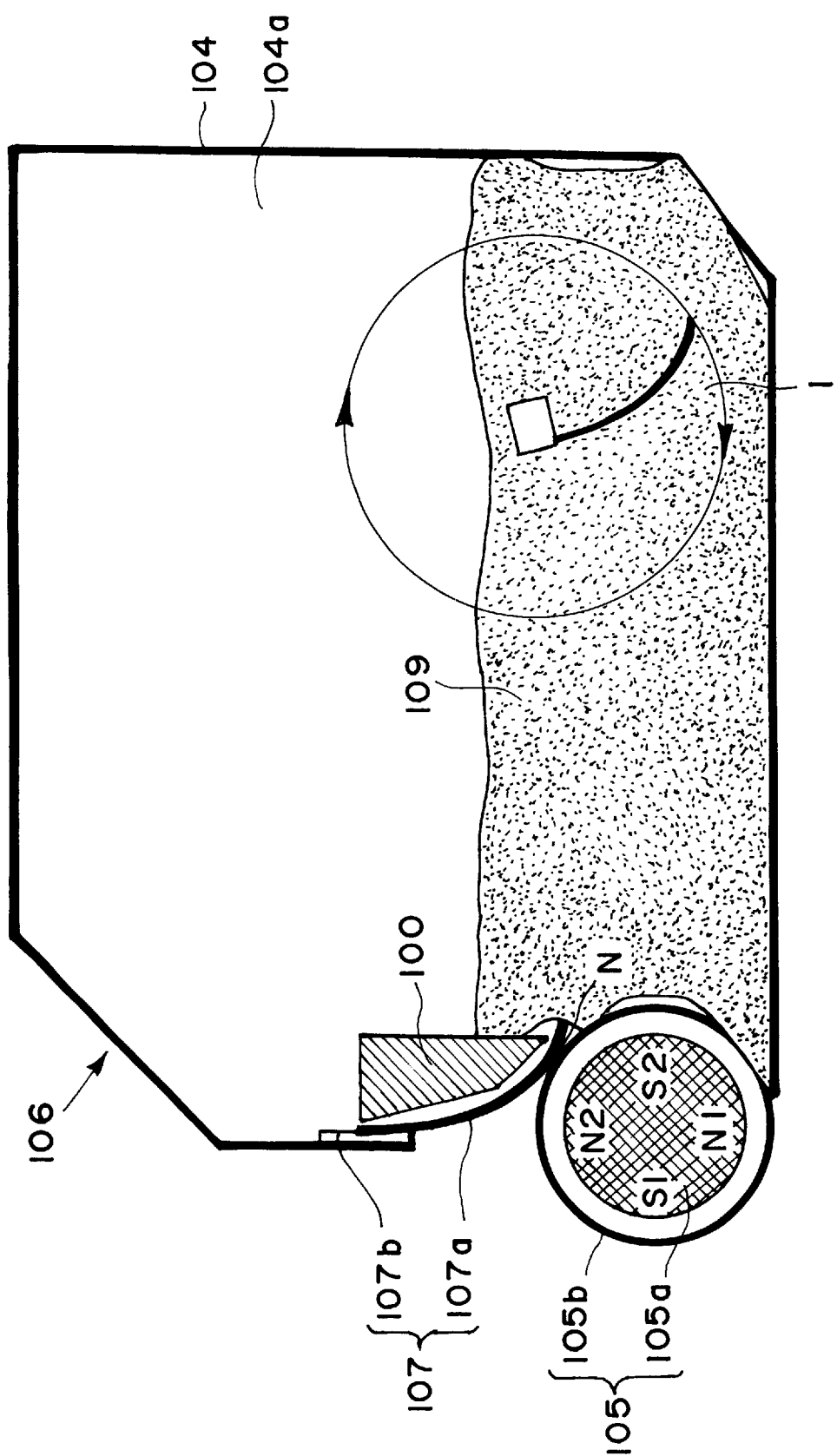
FIG. 1 is a sectional view of the developing device according to Embodiment 1 of the present invention.
Figure 2:
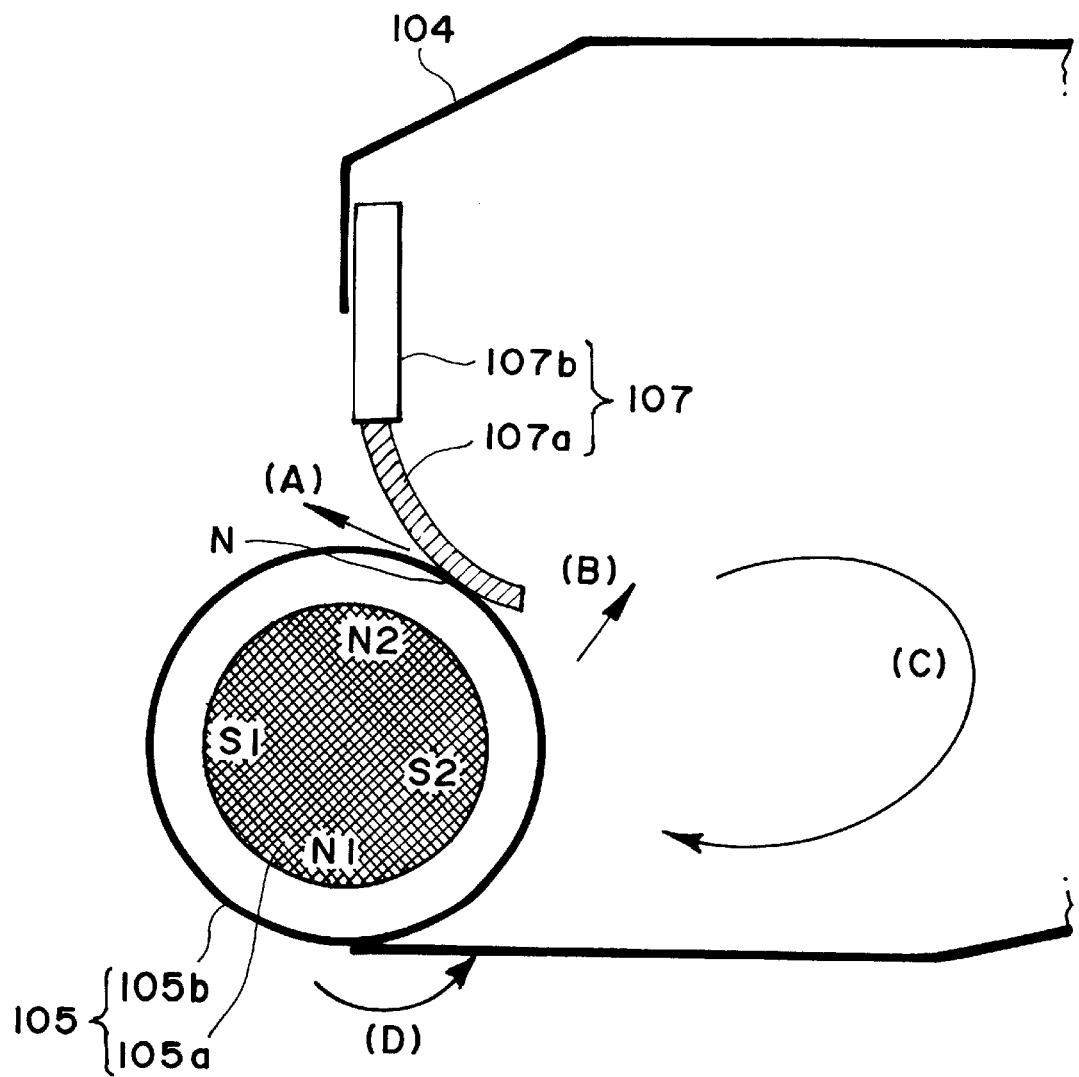
FIG. 2 is an illustration of behavior of a developer adjacent a developing zone of the developing roller in a developing device.
Figure 3:
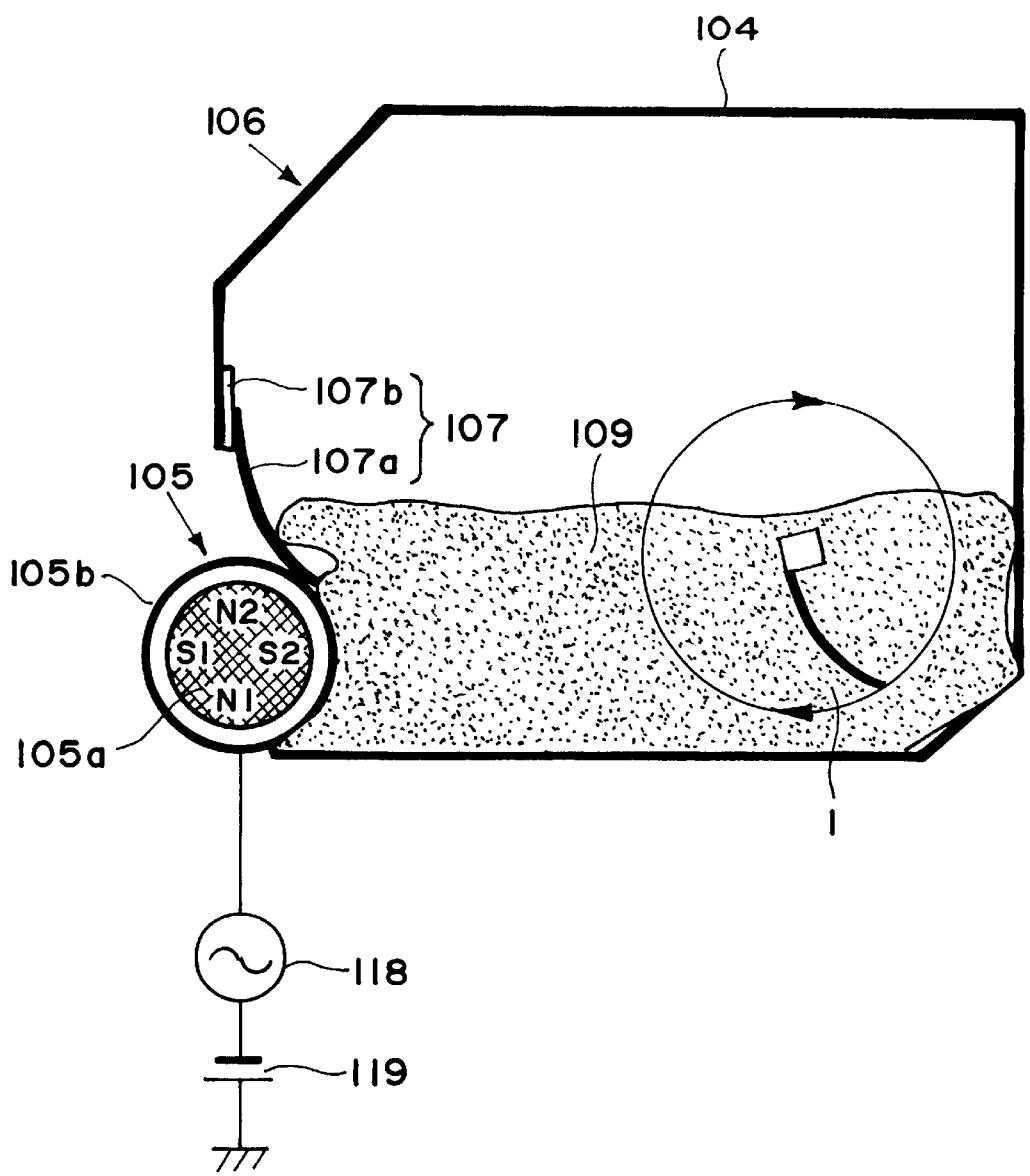
FIG. 3 is an illustration of a bias supplying voltage source for a developing device.
Figure 4:
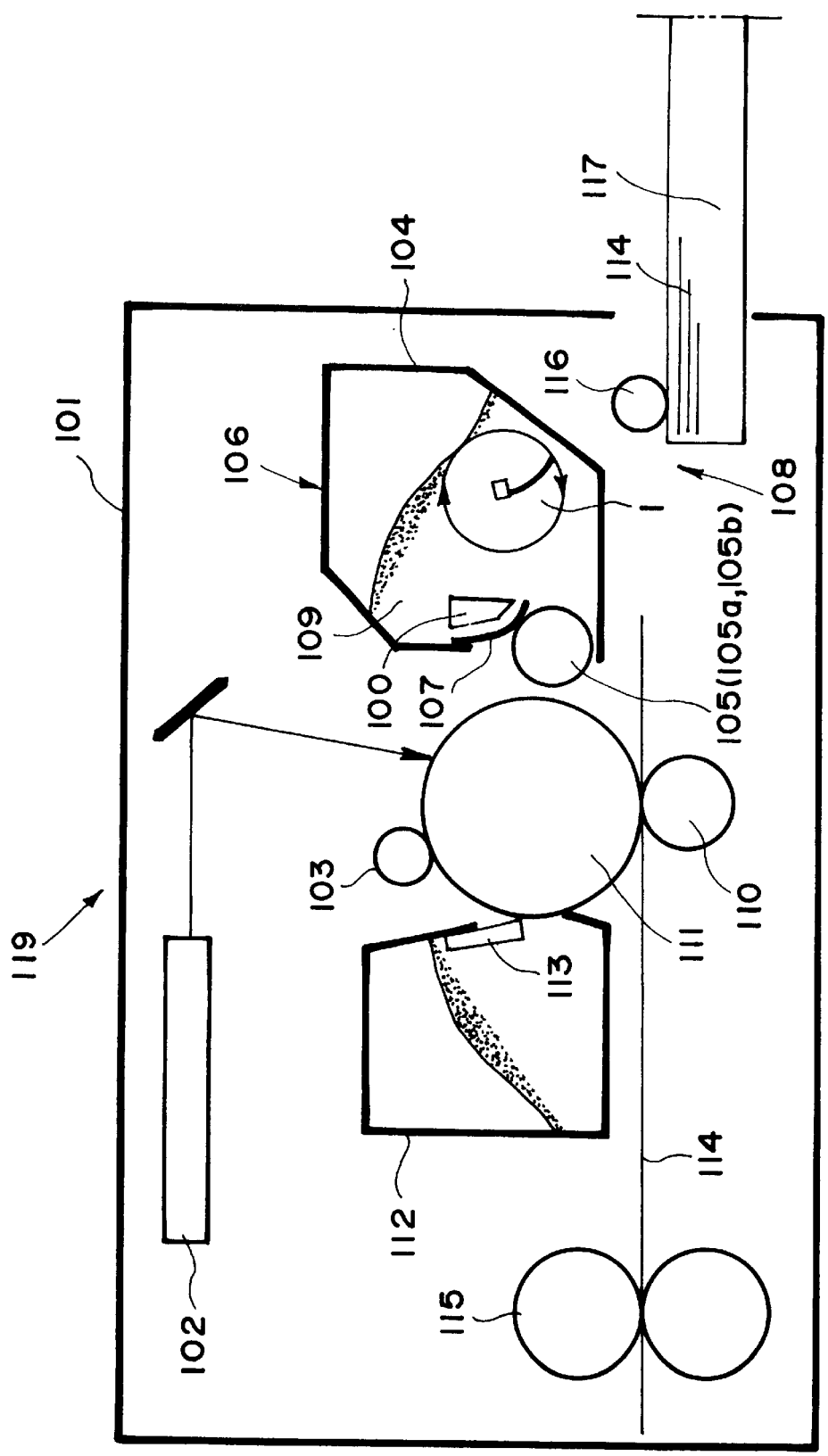
FIG. 4 is a schematic sectional view of an electrophotographic image forming apparatus according to Embodiment 1 of the present invention.
Figure 5B:
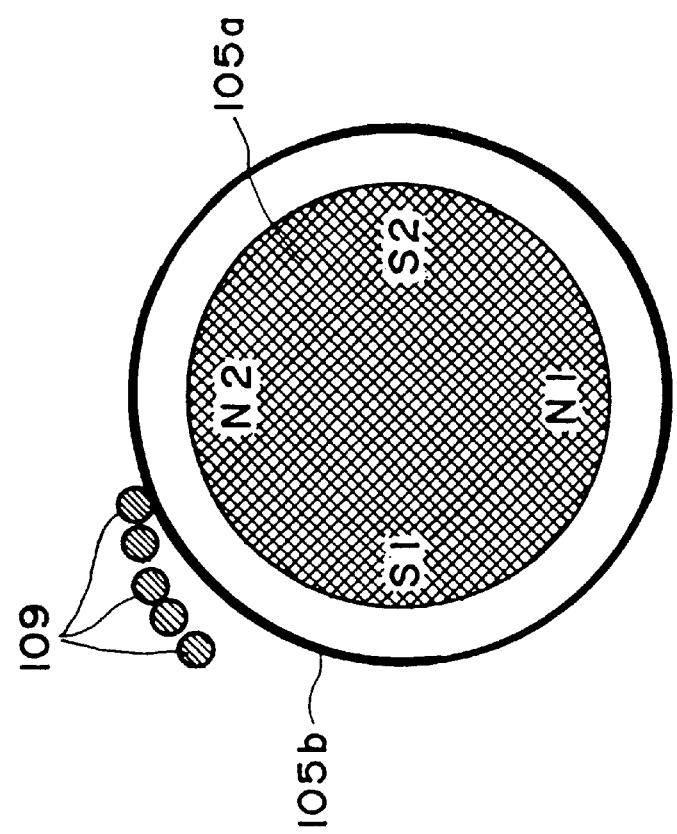
FIGS. 5(a) and 5(b) show relationships between magnetic force line of a magnetic flux generating member and alignment of the developer in the developing roller.
Figure 5A:
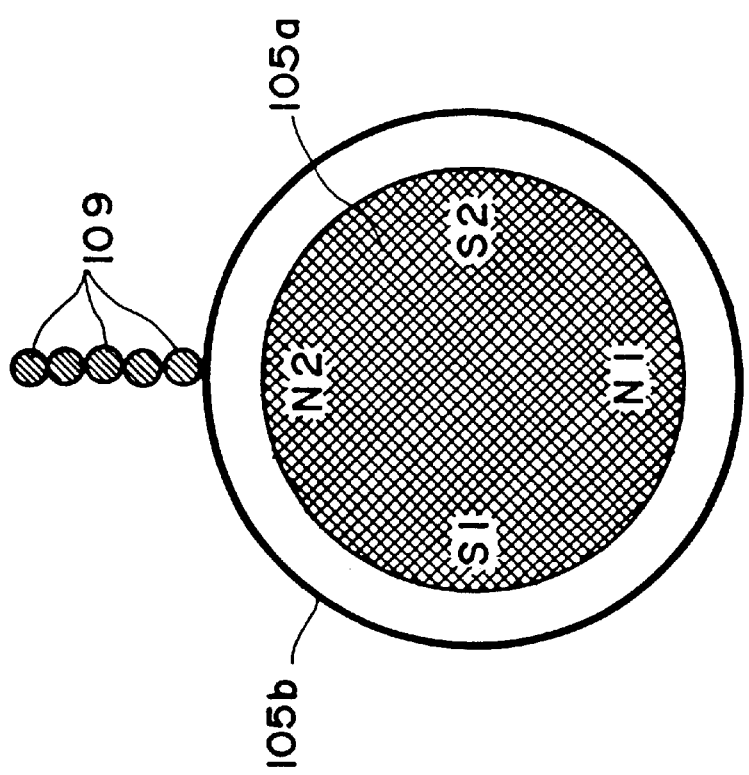
Figure 6:
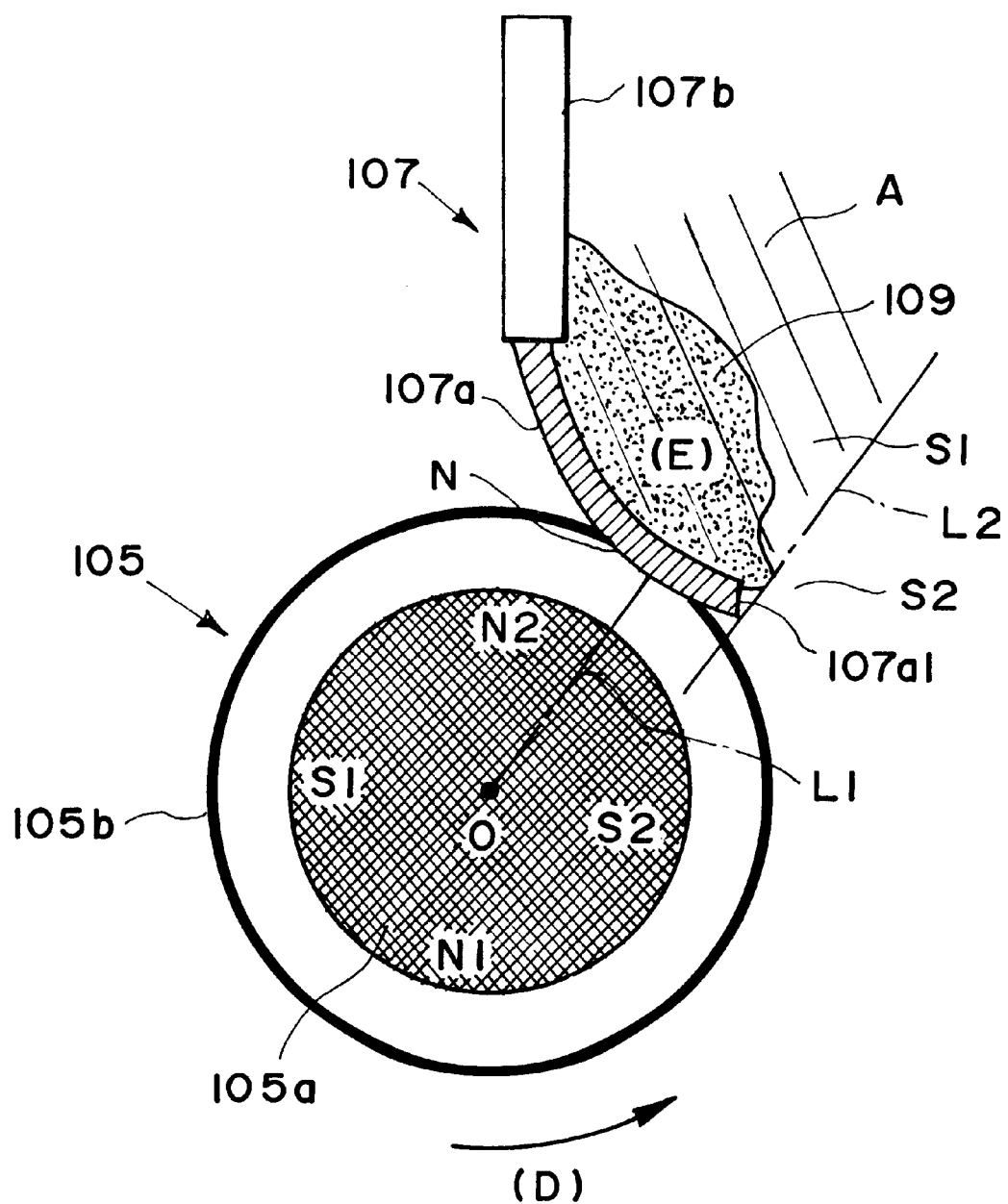
FIG. 6 is an illustration of a developer remaining on the backside of the developing roller and a position of a blocking member disposed at the backside of the developing roller.
Figure 7:
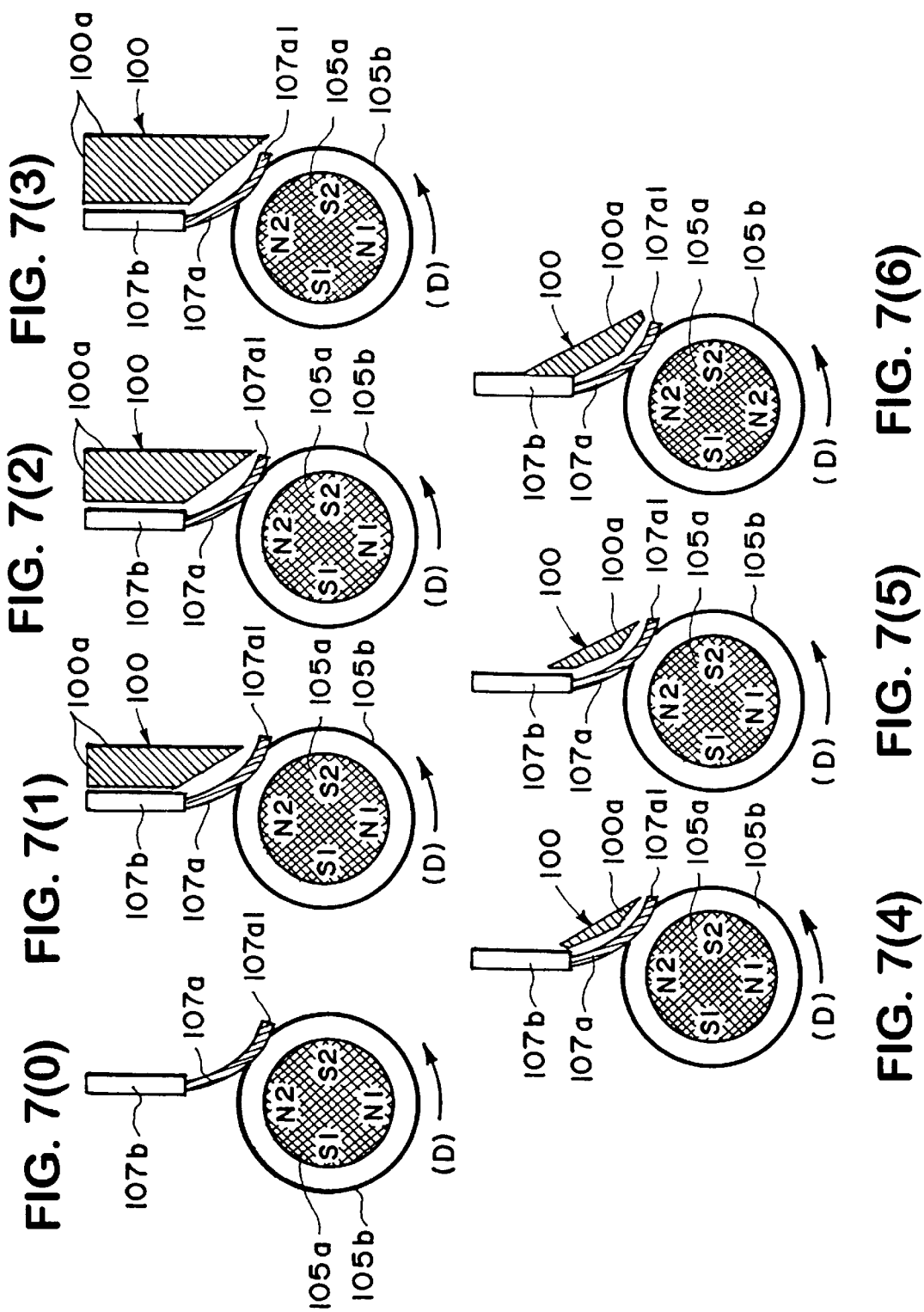
FIGS. 7(0) to 7(6) are illustrations of the position of the blocking member and thickness thereof.

Referring to FIGS. 1–7(6), an embodiment of the medium will be described. FIG. 1 is a sectional view of the developing device according to Embodiment 1 of the present invention. FIG. 2 is an illustration of behavior of a developer adjacent a developing zone of the developing roller in a developing device. FIG. 3 is an illustration of a bias supplying voltage source for a developing device. FIG. 4 is a schematic sectional view of an electrophotographic image forming apparatus according to Embodiment 1 of the present invention. FIGS. 5(a) and 5(b) show relationships between magnetic force line of a magnetic flux generating member and alignment of the developer in the developing roller. FIG. 6 is an illustration of a developer remaining on the backside of the developing roller and a position of a blocking member disposed at the backside of the developing roller. FIGS. 7(1) and 7(6) are illustrations of the position of the blocking member and thickness thereof. (Structure of developing device).

As shown in FIGS. 1–3, the developing device 106 of this embodiment comprises a developing device frame (facing) which is a developer container 104, a developer accommodating portion 104a and developing means 105 which are provided in the developer container 104.

The developing means 105 comprises a developer carrying member in the form of a developing roller 105b and a magnetic flux generating member (magnet roller) 105a which is stationary and is in the developing roller 105b. A developer (toner) 109 is accommodated in the developer accommodating portion 104a.

The developing device 106 functions to develop an electrostatic latent image formed on an electrophotographic photosensitive member 111 (FIG. 4) with the developer 109 into a visualized toner image. In the developing device 106, a rotatable developer feeding member 1 in the developer accommodating portion 104a feeds the developer 109 to the developing roller 105b, and the developing roller 105b containing the magnetic flux generating member 105a is rotated to form on a surface of the developing roller 105b a developer layer comprising developer particles given triboelectric charge by the developer regulating member 107. The developer is transferred onto the electrophotographic photosensitive member 111 in accordance with the electrostatic latent image. By doing so, a developed image, that is, a visualized image is formed.

The developing roller 105b is made of a nonmagnetic aluminum sleeve having the diameter of 16 mm. The surface thereof is coated with a resin material layer containing electroconductive particles. The magnetic flux generating member 105a provided in the developing roller 105b has four magnetic poles (S1 pole, S2 pole, N1 pole and N2 pole). The magnetic force of the magnetic poles of the magnetic flux generating member 105a is effective to carry the developer 109 on the surface of the developing roller 105b.

The developer regulating member 107 comprises an elastic member in the form of a developing blade 107a and a supporting metal plate 107b for mounting it. The supporting metal plate 107b is mounted to and supported by the developing container 104. The developing blade 107a is elastically contacted to the surface of the developing roller 105a. The designated by N is a contact portion (nip) formed between the developing blade 107a and the image roller 105b.

In this embodiment, the developing blade 107a is made of silicone rubber having a JIS hardness 40° approx. The contact force to the developing roller 105b at the contact portion N is adjusted to be 0.294–0.392N /cm (30–40 gf/cm, contact load per 1 cm in the longitudinal direction (axial direction) of the developing roller 105b. By the contact force, the developing blade 107a regulates the developer layer thickness to be constant on the developing roller 105b.

The developer 109 in this embodiment is a negative chargeable magnetic one component developer. It comprises 100 parts by weight of butylacrylate copolymer resin material as a binder resin, 80 parts by weight of magnetic particles, 2 parts of negative electrification control material of monoazo Fe complex, and 3 parts of low molecular weight polypropylene. They are melted and kneaded at 140° C. by biaxial extruder. The kneaded material is subjected to coarse pulverization using a hammer mill. The coarse pulverized material is pulverized into fine particles by a jet mill. The fine particles are classified using blow classification to provide classified powder having a weight average diameter of 5.0 $\mu$m. Into the classified material, 1.0 parts by weight of hydrophobic silica fine particle is mixed using Henschel mixer, thus providing developer particles. The developer particles having the weight average particle size of 3.5–7.0 $\mu$m (particularly 6 $\mu$m approx) are mainly used.

The developing roller 105b is supplied with a developing bias voltage. The developing bias applied to the developing roller 105b comprises a DC voltage of −500V, an AC voltage in the form of a rectangular wave having a Vpp of 1600V and a frequency of 2200 Hz in the case that gap between the electrophotographic photosensitive member 111 and the developing roller 105b is 300 $\mu$m approx, for example. The charged potential of the photosensitive member is Vd=−600V, and the potential of the portion exposed to a laser beam is Vl=−150V. The reverse development is carried out, that is, the Vlparts receive the toner.

Structure of Electrophotographic Image Forming Apparatus

Referring to FIG. 4, a description will be made as to an electrophotographic image forming apparatus using the developing device according to this embodiment.

In FIG. 4, reference numeral 119 generally designates the electrophotographic image forming apparatus. Designated by 101 is a main assembly of an electrophotographic image forming apparatus (main assembly of an image forming apparatus). Designated by 111 is an electrophotographic photosensitive member in the form of a drum (photosensitive drum) which is unidirectionally rotatable about a drum shaft (not shown). The surface of the electrophotographic photosensitive member 111 is uniformly charged by a charging device (charging roller) 103, and is exposed to a laser beam by an exposure device 102 so that and electrostatic latent image is formed.

The electrostatic latent image formed on the electrophotographic photosensitive member 111 is visualized with a developer 109 by a developing device 106. The developing roller 105b of the developing means 105, shown mean FIG. 3, is connected with the bias supplying voltage source compressing a DC voltage source 119 and an AC voltage source 118. By the bias supplying voltage source, the developing roller 105b is supplied with a proper developing bias voltage.

The developed image thus visualized on the electrophotographic photosensitive member 111 with the developer 109 is transferred onto a transfer material 114 (recording paper, OHP sheet, textile or the like) by a transferring device 110.

The transfer material 114 is fed from a cassette 117 by a feeding roller 116, and is fed to the transferring device 110 in synchronism with the developed image on the electrophotographic photosensitive member 111, by registration rollers (unshown).

The transfer material 114 now having the toner image transferred thereto is fed to a fixing device 115 where the toner image is fixed by heat and pressure into a permanent image.

On the other hand, the developer 109 remaining on the electrophotographic photosensitive member 111 without being transferred, is removed by a cleaning device 112 having a cleaning blade 113.

Thereafter, the surface of the electrophotographic photosensitive member 111 is electrically charged again by the charging device 103, and the above-described operations are repeated.

The feeding roller 116 and the registration rollers (unshown) constitute feeding means 108 for feeding the transfer material 114.

Relationship Between Line of Magnetic Force Provided By Magnetic Flux Generating Member and Alignment of Developer Referring to FIG. 5, the description will be made as to the magnetic flux generating member 105a disposed in the developing roller 105b.

First, the description will be briefly made as to the relationship between the magnetic force line provided by the magnetic flux generating member 105a and the alignment of the developer 109.

Since the developer 109 is magnetic, the developer particles are aligned along the lines of magnetic force generated by the magnetic flux generating member 105a. More particularly, as shown in FIG. 5, (a), the particles are aligned vertically at the position of the magnetic pole (the chains of the developer particles are erected), and horizontally away from the magnetic pole as shown in FIG. 5 (b) (the chains are laid down).

The magnetic flux generating member 105a used in this embodiment comprises the S1 pole, the S2 pole, the N1 pole and the N2 pole (4 poles), as mentioned hereinbefore. The respective magnetic poles will be described.

S1 pole is a developing pole which is opposed to the electrophotographic photosensitive member 111 and functions to develop the electrostatic latent image. The development is effected with the erected chains of the developer, by which high image quality is provided.

N1 pole is a shield pole which functions to effect magnetic seal to prevent the developer 109 from leaking out of the developer container 104.

S2 pole is a take-in pole which functions to attract the developer 109 in the developer container 104 to the surface of the developing roller 105b.

N2 pole is a feeding pole which functions to adjust the amount of the developer 109 passed through the contact portion N between the developing blade 107a of the developer regulating member 107 and the developing roller 105b with the horizontal state of the chains of the developer 109 to feed the developer 109 to the developing zone.

Behavior of Developer Adjacent of Developing Roller

A description will be made as to the behavior of the developer adjacent the developing roller referring to the usual structure of the developing device shown in FIG. 2. The same reference numerals are assigned to the elements having the corresponding functions.

1: the developer (unshown) in the developer container 104 is attracted onto the surface of the developing roller 105b by the magnetic force provided by the S2 pole of the magnetic flux generating member 105a disposed in the developing roller 105b.

2: the developer attracted to the surface of the developing roller 105b is conveyed to the contact portion N formed between the development blade 107a of the developer regulating member 107 and the developing roller 105b by the rotation of the developing roller 105b (the direction of arrow (D) in the figure).

3: the developer having reached the contact portion N is regulated in the developer layer thickness by the developing blade 107a, so that developer is divided into a portion (A) which is fed to the developing zone toward the electrophotographic photosensitive member (unshown) and a portion (B) which is returned into the developer container 104.

4 (A): the developer fed to the developing zone is more easily used for developing the electrostatic latent image on the electrophotographic photosensitive member (not shown), or simply returns into the developer container 104.

4 (B): the developer returned into the inner is circulated as indicated by an arrow (C), and is again attracted by the S2 pole of the magnetic flux generating member 105a onto the developing roller 105b.

5: with repetition of the operations 1–4, the amount of the developer in the developer container 104 decreases, and when the developer is not present adjacent the contact portion between the developing blade 107a and the developing roller 105b, the problem development is not possible with a result of so-called white void.

In the structure of a developing device shown in FIG. 2, the developing operations were actually carried out until the white void occurs the first time, and the remaining developer was checked. As shown in FIGS. 6, (E), it has been confirmed that developer 109 stagnates and remains on the back side of the developing blade 107a, that is, the side of the developing blade 107a opposite from the developing roller 105. The amount of the developer corresponds to as much as 300 sheets to 400 sheets at the 4% print ratio.

It is considered that developer 109 stagnates their because the developer 109 is strongly attracted by the N2 pole of the magnetic flux generating member 105a. The amount of the developer remainder increases with increase of the magnetic force at the position.

From the standpoint of the function of the N2 pole described hereinbefore, the N2 pole is preferably positioned downstream of the contact portion N between the developing blade 107a and the developing roller 105b. The rotational direction of the developing roller 105b is shown by arrow D.

Therefore, it is difficult to significantly change the position of the magnetic pole N2 in an attempt to avoid the stagnation of the developer on the backside of the developing blade 107a.

Reducing Measurement of Developer Remainder on Backside of Developing Blade

As a countermeasure against the stagnation on the backside of the developing blade 107a, a blocking (preventing member, filler member or entering suppression member) for blocking or preventing the developer 109 from entering the portion where the magnetic force provided by the magnetic flux generating member 105a is strong in the backside of the developing blade 107a as shown in FIG. 1, according to this embodiment of the present invention.

The blocking member 100 covers substantially the entirety of the developing blade 107a extended in the longitudinal direction of the developing roller 105b. The blocking member 100 is mounted to the inner wall of the developer accommodating portion 104a by a double coated tape, an adhesive material, screws or the like. It may be mounted to the plate 107b of the developer regulating member 107.

In this example, the blocking member 100 is pasted for easiness of experiments. The material is not limiting unless it is magnetic. Practically however, it is preferably integrally molded with the container from the standpoint of cost.

The configuration of the blocking member 100 depends on the magnetic pole and magnetic force provided by the magnetic force generating member 105a in the developing roller 105b, and therefore, the configuration is not clearly determined.

Quantitatively, it is desirable that developer does not enter the space where the magnetic flux density is 30 mT or larger.

The experiments have been carried out with the developing device not having the blocking member as shown in FIG. 7 and a developing device having the blocking member 100 as shown in FIGS. 7(1)–7(6) on the backside of the developing blade 107a. In the experiments, the images and the developer remainder amount at the time of the first occurrence of the white void were checked.

Here, FIGS. 7(1)–7(6) show examples wherein the position of the blocking member 100 is changed the relative to the free end 107a1 of the developing blade 107a. FIG. 7(1) shows an example in which the blocking member 100 is disposed above the free end 107a1 of the developing blade 107a. In FIG. 7(2) the blocking member 100 is disposed at the free end 107a1 of the developing blade 107a. In FIG. 7(3) the blocking member 100 is disposed below the free end 107a1 of the developing blade 107a.

In FIGS. 7(4)–7(6) the thickness of the blocking member 100 is adjusted so as to change the maximum magnetic flux density on the surface 100a of the blocking member 100 at the side where the developer is present (opposite from the developing blade 107a side). FIG. 7(4) shows a main assembly in which the thickness of the blocking member 100 is adjusted such that magnetic flux density on the surface 100a of the blocking member 100 at the developer contacting side is 30 mT. In FIG. 7(5) the thickness of the blocking member 100 is adjusted such that magnetic flux density on the surface 100a of the blocking member 100 at the developer contacting side is 20 mT. In FIG. 7(6) the thickness of the blocking member 100 is adjusted such that magnetic flux density on the surface 100a of the blocking member 100 at the developer contacting side is 15 mT.

Experiment Method

Patterns having a print ratio 4% are printed out continuously, and the defects on the printed images are checked periodically. When the white void occurs, the amount of the developer remaining on the backside of the developing blade is measured. The results are shown on Table 1.

TABLE 1

|  |  | Mag. Flux | Toner Remain Density | Image Defect (g) |
|---|---|---|---|---|
| FIG.7, (0) | No Blocking member |  | 20 | No |
| FIG.7, (1) | Blocking member: upper pos |  | 1 | No |
| FIG.7, (2) | Blocking member: middle |  | 1 | No |
| FIG.7, (3) | Blocking member lower |  | 0 | Low Density |
| FIG.7, (4) | Mag. force: strong | 30 mT | 8 | No |
| FIG.7, (5) | Mag. force: middle | 20 mT | 1 | No |
| FIG.7, (6) | Mag. force: weak | 15 mT | 1 | No |

As will be understood when the comparison is made among (0), (1), (2) and (3), the developer remainder amount can be significantly reduced with any structure of the blocking member. However, when the blocking member 100 is below the free end 107a1 of the developing blade 107a, the circulation of the developer is significantly obstructed, and therefore, the resultant images involves defects. This is because the developer is contacted to the blocking member 100 immediately after the developer is departed from the free end 107a1 of the developing blade 107a, and therefore, the circulation of the developer shown by (C) in FIG. 2 becomes very small. As a result, the load applied to the developer increases.

From the results of experiments, it is understood that blocking member 100 is desirably disposed at or above the free end 107a1 of the developing blade 107a.

It is understood when the comparison is made among FIGS. 7(4), 7(5) and 7(6) that an amount of the developer remainder on the backside of the developing blade 107a when the magnetic flux density on the surface 100a of the blocking member 100 at the developer contacting side is 30 mT or larger. When the magnetic flux density on the surface 100a of the blocking member 100 at the developer contacting side is less than 20 mT, the amount of the developer remainder on the backside of the developing blade 107a remarkably reduces.

It has been empirically confirmed that developer falls assuredly if the magnetic flux density on the surface 100a of the blocking member 100 at the developer contacting side is lower than 20 mT.

Additionally, the amount of the developer remainder at the first occurrence of the white void is more if the angle of the blocking member 100 is closer to horizontal, and if the resistance of the surface 100a of the blocking member 100 is smaller.

As described hereinbefore, according to this embodiment, the blocking member 100 is provided on at least a part of the portion where the magnetic force at the backside of the developing blade 107a is strong, thus accomplishing to use up the developer in the developer accommodating portion with minimum remainder of the developer.

More particularly, the blocking member 100 is provided to occupy at least a part of the space where the magnetic flux density is not less than 30 mT at the backside of the developing blade 107a.

Moreover, the amount of the developer remaining on the bedside of the developing blade 107a at the first occurrence of the white void can be reduced without raising a problem with the image by making the magnetic flux density on the surface 100a of the blocking member 100 at the developer contacting side not more than 20 mT and by not extending the blocking member 100 beyond the free end 107a1 of the developing blade 107a.

Here, not extending the blocking member 100 beyond the free end 107a1 of the developing blade 107a means that as shown in FIG. 6, the blocking member 100 is not present in a region S1 downstream, with respect to the rotational moving direction (D) of the developing roller 105b, of a line L2 which passes through the free end 107a1 of the developing blade 107a and which is parallel with a line L1 connecting a center of rotation O of the developing roller 105b and the contact portion N between the developing roller 105b and the developing blade 107a of the developer regulating member 107.

In FIG. 7(1), the blocking member 100 is disposed in the region S1 where the developing blade 107a is present.

In FIG. 7(3), the blocking member 100 extends between the region S1 and a region S2 where the developing blade 107a is not present.

Thus, according to this embodiment, the blocking member 100 is provided such that developer 109 does not enter such a portion of the space at the backside of the developing blade 107a as has a strong magnetic force provided by the magnetic pole of the magnetic flux generating member 105a. By doing so, the blocking member 100 is effective to prevent the developer 109 from entering the backside portion of the developing blade 107a. Accordingly, the developer 109 does not stagnate on the backside of the developing blade 107a. As a result, the developer 109 can be consumed efficiently.

Embodiment 2

A description will be made as to a process cartridge including the developing device according to Embodiment 1.

The process cartridge includes the developing device having the structure shown in FIG. 2 (Embodiment 1). When the so-called white void occurs due to the lack of the developer adjacent the contact portions between the developing blade 107a and the developing roller 105b, the process cartridge is shaked to use the developer up. By shaking the process cartridge, the developer remaining in the inner corner portions of the developer container can be moved to the contact portion. If the white void still occurs immediately after the shaking, it is considered that lifetime of a process cartridge ends, therefore, the process cartridge should be exchanged.

In such a process cartridge, the developer remains on the backside of the developing blade (the side thereof opposite from the developing roller). The developer existing on the backside of the developing blade is attracted on the surface of the developing roller by the magnetic force provided by the magnetic flux generating member, and such a developer remains there at the first occurrence of the white void in many cases. The amount of the developer remaining there is reduced by firmly shaking the process cartridge.

Thus, the usable developer might remain in the developer container even when the white void occurs the first time. In such a case, the user may shake the process cartridge in a manner that developer is fed to the contact portion.

In this embodiment, the developing device according to the Embodiment 1 is incorporated in a process cartridge detachably mountable to the main assembly of the image forming apparatus, the process cartridge including the electrophotographic photosensitive member, the cleaning device and the charging device.

Figure 8:
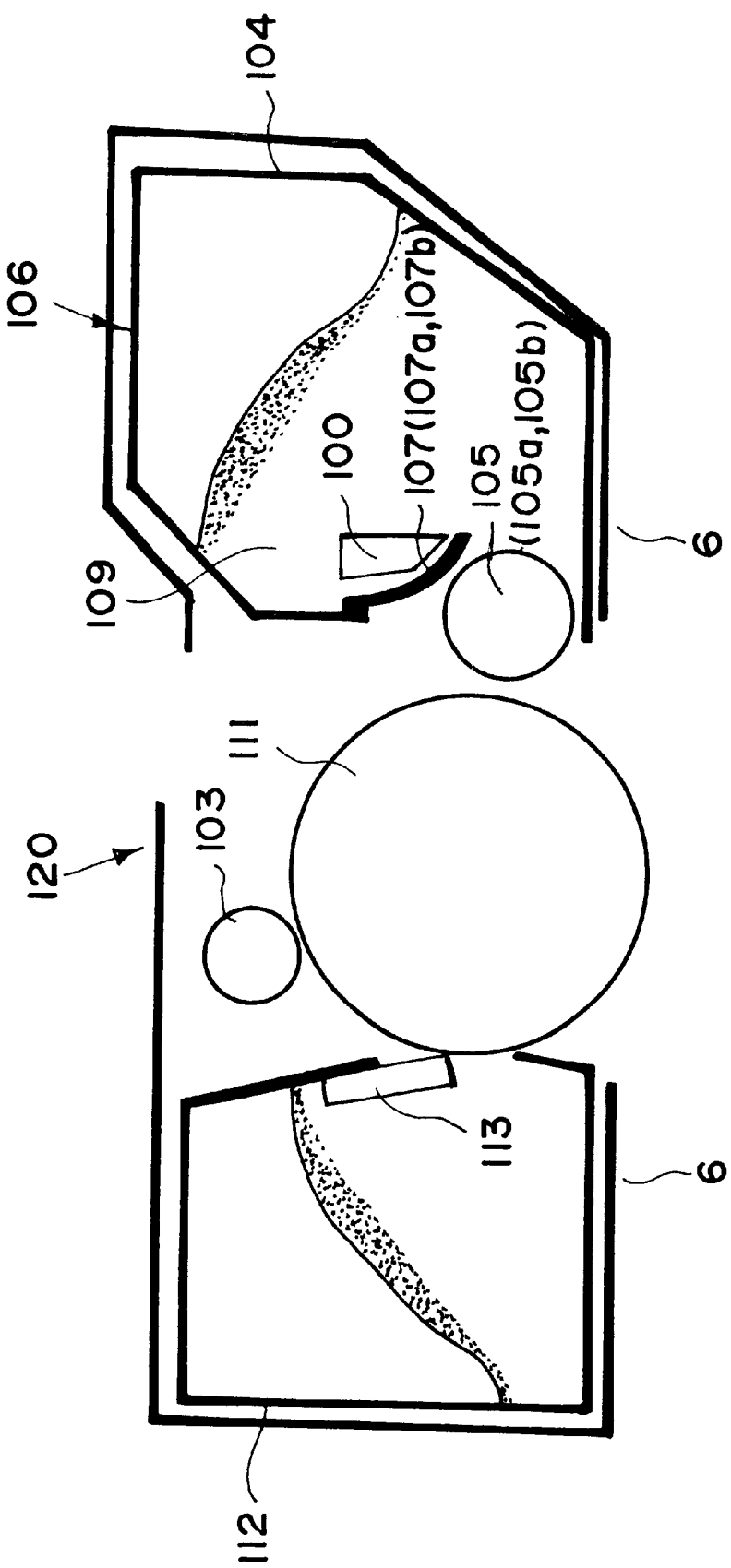
FIG. 8 is a sectional view of a process cartridge according to Embodiment 2 of the present invention.
Figure 9:
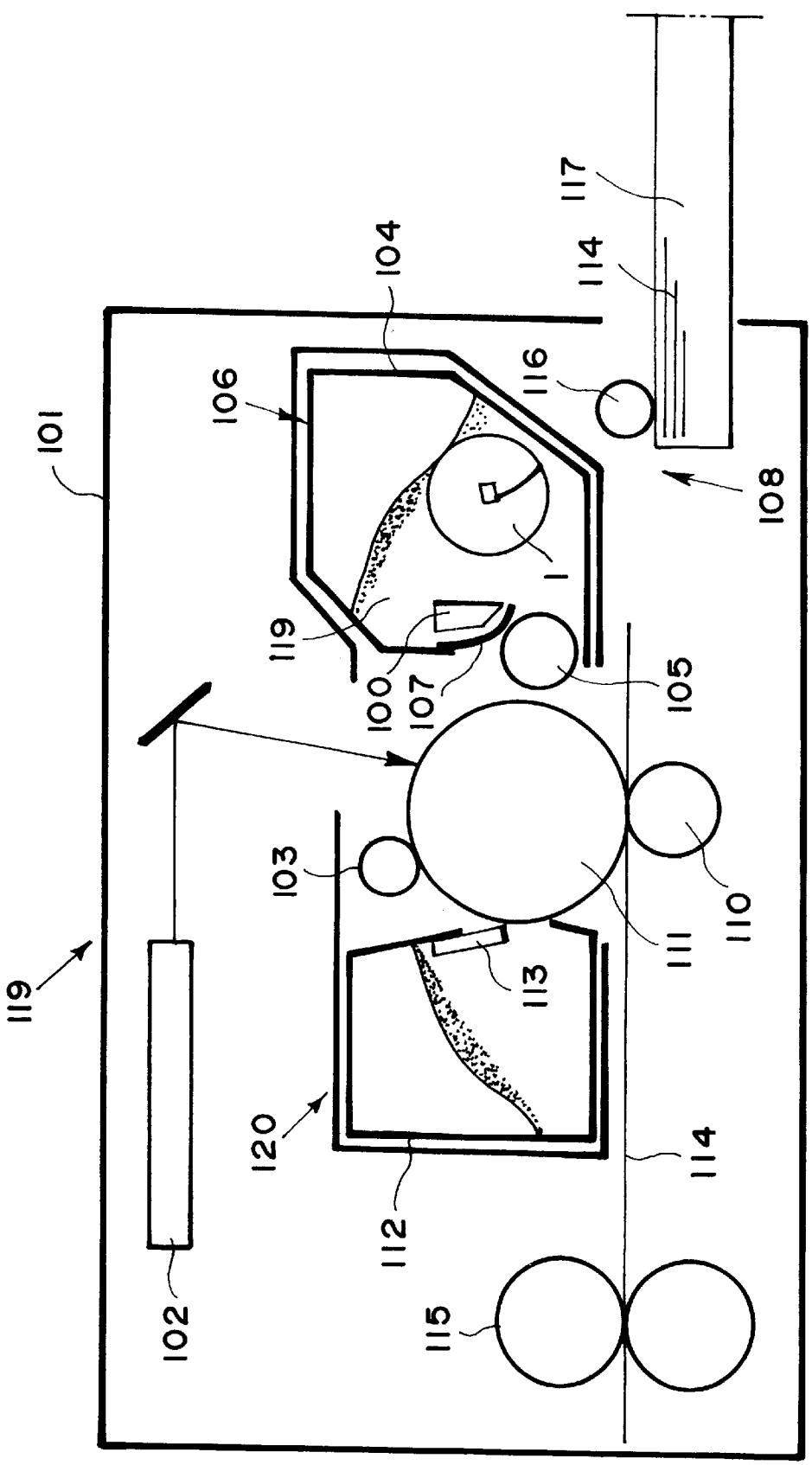
FIG. 9 is a sectional view of an electrophotographic image forming apparatus according to Embodiment 2.

FIG. 8 is a sectional view of the process cartridge according to this embodiment, and FIG. 9 is a sectional view of an electrophotographic image forming apparatus when the process cartridge of this embodiment is mounted to the main assembly of the image forming apparatus. In FIGS. 8 and 9, the same reference numeral as with Embodiment 1 are assigned to the elements having the corresponding functions.

The process cartridge 120 of this embodiment includes the developing device 106 of Embodiment 1, the electrophotographic photosensitive member 111, the cleaning device 112 (cleaning means), and the charging device 103 (charging means), which are contained in a casing which comprises a cartridge frame and an outer casing member 6.

The process cartridge 120 is detachably mounted to cartridge mounting means provided in the main assembly 101 of the image forming apparatus.

When a cover member (unshown) provided in the main assembly 101 of the image forming apparatus is rotated about a shaft to open it, a space for the cartridge mounting portion is exposed, and guide members (unshown) for guiding the process cartridge are provided at left and right sides thereof. A guide (unshown) including a boss and a rib provided at each of left and right sides of the outer casing member 6 of the process cartridge 120 is engaged with the mounting guide member of the main assembly, and the process cartridge 120 is detachably mounted to the predetermined position of the main assembly 101 of the image forming apparatus.

The process cartridge of this embodiment is provided with a blocking member 100 so that developer 109 is prevented from entering the backside of the developing blade 107a in the developing device 106. By this, the developer 109 does not stagnate on the backside of the developing blade 107a, and as a result, the developer 109 can be used efficiently.

When the developer 109 in the developer container 104 of the developing device 106 is used up, a lifetime of another device (charging device 103) ends substantially simultaneously. By doing so, the user is assured with stabilized image formations as long as the developer 109 remains in the process cartridge 120. Since the developing device 106, the electrophotographic photosensitive member 111, the cleaning device 112 and the charging device 103 are contained in the cartridge as a unit, they can be exchanged without difficulty.

In addition to the advantages of the process cartridge (stable image formation and easy maintenance), the developer 109 can be used efficiently without difficulty.

Other Embodiments

In the foregoing Embodiments, there is provided a blocking member 100 exclusively for preventing the developer from entering the region opposite from a portion where the developer regulating member 107 is opposed to the developing roller 105b. However, it may be used also as a developer remainder detecting means, wherein the blocking member 100 is made of an electroconductive member to constitute a capacitor with the developing roller 105b or another electroconductive member, with which the electrostatic capacity changes with the amount of the developer in the space to which said center is sensitive.

Figures 10A, 10B:
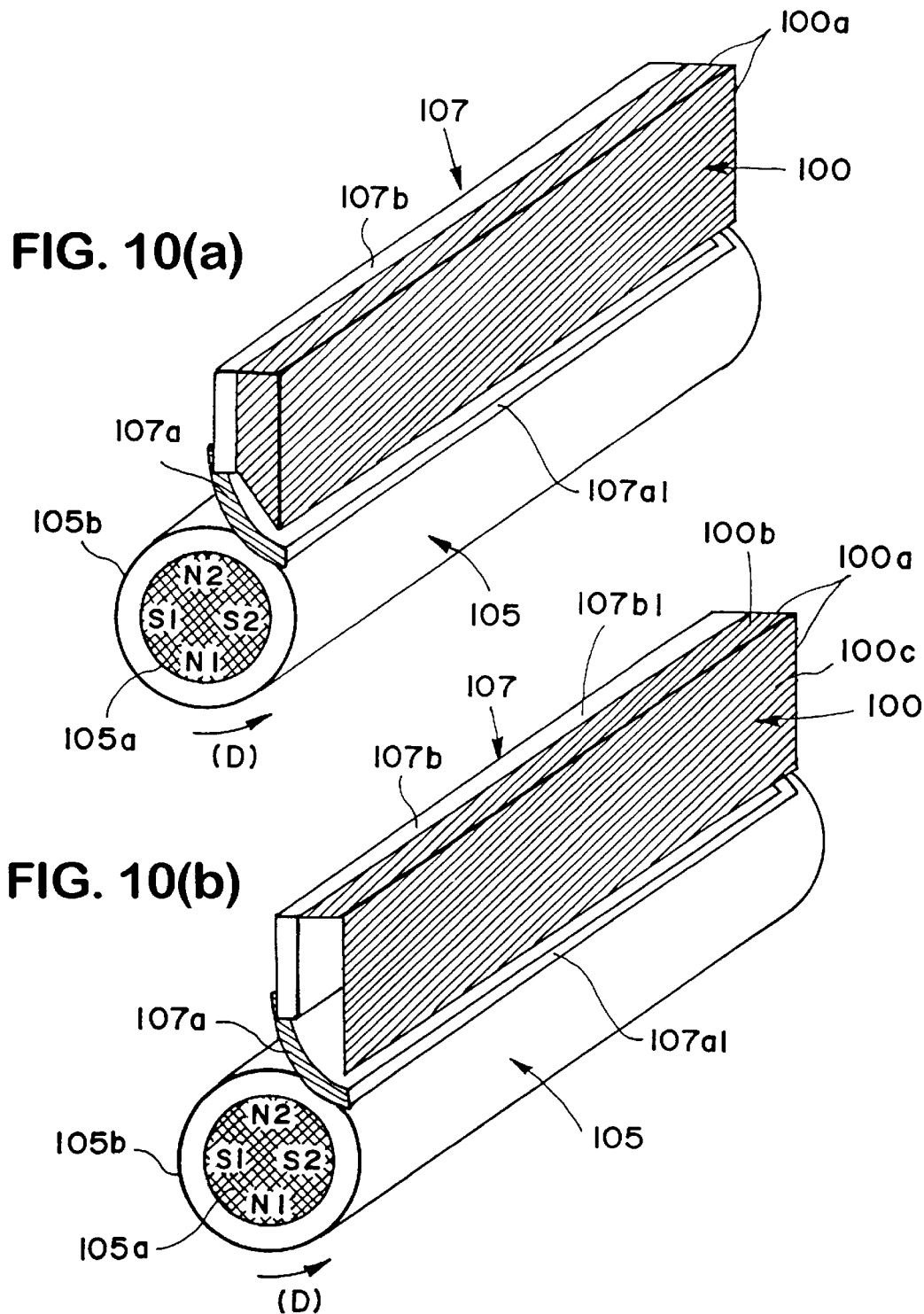
FIGS. 10(a) and 10(b) are illustrations of a blocking member in the form of a plate.

The blocking member 100 does not necessarily, the entire year of the portion where the magnetic force is strong, shown in FIG. 10(a). As shown in FIG. 10(b), it may be in the form of a plate if the developer does not enter between the plate and the developer regulating member 107. As shown in FIG. 10(b), the regulating member 100 may comprise a first part 100b projected in the direction crossing with a plate 107b substantially at the same level as the upper surface 107b1 of the plate 107b and a second part 100c which extends substantially perpendicularly to the first part 100b along the short side of the plate 107b to the backside of the elastic member 107a. At this time, the outside surfaces 100a of the first part 100a and the second part 100b are disposed in the region where the magnetic flux density provided by the magnetic pole of the magnetic flux generating member 105a is not more than 20 mT. The first part 100b and the second part 100c are integral with each other, and are mounted to the inner wall of the developer accommodating portion 104a.

In the foregoing embodiments, the developer accommodating portion accommodates the developer while the developing operation is carried out.

In the foregoing embodiments, the developing device and/or the electric energy supply part are used for a process cartridge for forming a monochromatic image, but the developing device and/or the electric energy supply part according to the present invention are usable with a cartridge for forming multi color images (2color image, 3color image, full-color or the like) in which a plurality of the developing means are provided.

In the above-described, the electrophotographic photosensitive member has been described as photosensitive drum, but the electrophotographic photosensitive member is not limited to such a photosensitive drum, but the following is usable. The photosensitive member may be a photoconductor which may be an amorphous silicon, amorphous selenium, zinc oxide, titanium oxide, organic photoconductor (OPC) or the like. The photosensitive member may be in the form of a drum, a belt or another rotatable member, or a sheet, or the like. Generally, however, a drum or a belt is used, and in the case of a drum type photosensitive member, a cylinder of aluminum alloy or the like is coated with a photoconductor by evaporation or application or the like.

Also, the present invention is preferably usable with various known developing methods such as the magnetic brush developing method using two component toner, the cascade developing method, the touch-down developing method, the cloud developing method.

The structure of the charging means described in the foregoing is of a so- called contact type charging method, but a known charging means comprising a tungsten wire which is enclosed width metal shield of aluminum or the like at three sides, wherein positive or negative ions generated by application of a high voltage to said tungsten wire are directed to the surface of the photosensitive drum to uniformly charged the surface, is usable.

The charging means may be a roller type as described in the foregoing, a blade type (charging blade), a pad type, a block type, a rod type, a wire type or the like.

As for a cleaning method for removing toner remaining on the photosensitive drum, a blade, a fur brush, a magnetic brush or the like is usable.

The process cartridge, for example, comprises an electrophotographic photosensitive member and at least one process means. As for the types of the process cartridge, there are, in addition to those disclosed hereinbefore, a type in which, for example, an electrophotographic photosensitive member, a developing means and a charging means are unified integrally into a cartridge which is detachably mountable to the main assembly of the electrophotographic image forming apparatus, a type in which an electrophotographic photosensitive member and a developing means are unified integrally into a cartridge which is detachably mountable to a main assembly of apparatus, a type in which an electrophotographic photosensitive member, a developing means, a charging means and cleaning means are unified integrally into a cartridge which is detachably mountable to a main assembly of an electrophotographic image forming apparatus, they tied in which an electrophotographic photosensitive member and two or more of the process means are combined integrally into a cartridge which is detachably mountable to a main assembly of an electrophotographic image forming apparatus.

The process cartridge may contain an electrophotographic photosensitive member and at least one of charging means, developing means and cleaning means as a unit which constitutes a cartridge which is detachably mountable to a main assembly of an electrophotographic image forming apparatus. It may comprise an electrophotographic photosensitive member and at least one of charging means, developing means and cleaning means. It may comprise at least developing means and electrophotographic photosensitive member. The process cartridge is mounted to or demounted from the main assembly of the apparatus by the user. This means that maintenance of the apparatus is carried out, in effect, by the user.

In the foregoing environment, a laser beam printer has been described in the foregoing as an example of the electrophotographic image forming apparatus, but the present invention is not limited thereto, and the present invention is applicable to an electrophotographic copying machine, a facsimile machine, a facsimile machine or the like of an electrophotographic type.

As described in the foregoing, according to the developing device of the embodiment of this invention, the developer is prevented from stagnating at the such a side of the developer regulating member as is remote from the developing roller, so that amount of the developer remaining there can be reduced, and therefore, the developer can be used more efficiently.

As described in the foregoing, according to the process cartridge of the embodiments of this invention, the developer is prevented from stagnating at the such a side of the developer regulating member as is remote from the developing roller, so that amount of the developer remaining there can be reduced, and therefore, the developer can be used more efficiently.

As described in the foregoing, according to the electrophotographic image forming apparatus of the embodiments of this invention, the developer is prevented from stagnating at the such a side of the developer regulating member as is remote from the developing roller, so that amount of the developer remaining there can be reduced, and therefore, the developer can be used more efficiently.

As described in the foregoing, according to the electrophotographic image forming apparatus of this invention, the developer in the developing means in the process cartridge is prevented from stagnating at the such a side of the developer regulating member as is remote from the developing roller, so that amount of the developer remaining there can be reduced, and therefore, the developer can be used more efficiently.

The developing device 106 according to the embodiments are summarized as follows:

A developing device 106 for developing an electrostatic latent image formed on electrophotographic photosensitive member 111, said developing device 106 comprising:

(a) a developer accommodating portion 104*a* for accommodating a magnetic developer;

(b) a developing roller 105*b* for developing with the developer the electrostatic latent image formed on said electrophotographic photosensitive member 111, said developing roller 105*b* containing therein a magnetic flux generating member 105*a* which is effective to generate a magnetic force by which the developer is carried on a peripheral surface of said developing roller 105*b*;

(c) a developer regulating member 107 for regulating an amount of the developer carried on the peripheral surface of said developing roller 105*b*; and (d) a blocking member 100 for blocking the developer from entering such a side of said developer regulating member 107 as is opposite from said developing roller 105*b*.

The process cartridge 120 according to the embodiments are summarized as follows:

A process cartridge 120 detachably mountable to a main assembly 101 of one electrophotographic image forming apparatus 119, comprising:

(a) an electrophotographic photosensitive member 111;

(b) a developer accommodating portion 104*a* for accommodating a magnetic developer;

(c) a developing roller 105b for developing with the developer an electrostatic latent image formed on said electrophotographic photosensitive member 111, said developing roller 105b container therein a magnetic flux generating member 105a, and carries the developer on a peripheral surface thereof by a magnetic force generated by said magnetic flux tender rating member;

(d) a developer regulating member 107 for regulating an amount of the developer carried on the peripheral surface of said developing roller 105b;

(e) a blocking member 100 for blocking the developer from entering such a side of said developer regulating member 107 as is opposite from said developing roller 105b.

The image forming apparatus 119 is summarized as follows:

An electrophotographic image forming apparatus 119 for forming an image, recording material 114, comprising:

(a) an electrophotographic photosensitive member 111;

(b) a developer accommodating portion 104a for accommodating a magnetic developer;

a developing device 106 for developing an electrostatic latent image on said electrophotographic photosensitive member 111, said developing device 106 including;

a developing roller 105b for developing with the developer the electrostatic latent image formed on said electrophotographic photosensitive member 111, said developing roller 105b container therein a magnetic flux generating member 105a, and carries the developer on a peripheral surface thereof by a magnetic force generated by said magnetic flux tender rating member;

a developer regulating member 107 for regulating an amount of t developer carred on a peripheral surface of said developing roller 105b;

a blocking member 100 for blocking the developer from entering such a side of said developer regulating member 107 as is opposite from said developing roller 105b;

(c) feeding means 108 for feeding the recording material 114.

The main assembly 101 of the image forming apparatus 119 is summarized as follows:

A main assembly 101 of an electrophotographic image forming apparatus 119 for forming an image on a recording material 114, to which a process cartridge 120 is detachably mountable, said apparatus 119 comprising:

(a) an electrophotographic photosensitive member 111;

a developer accommodating portion 104a for accommodating a magnetic developer;

a mounting portion for mounting a process cartridge 120, said process cartridge 120 including;

a developing roller 105b for developing with the developer the electrostatic latent image formed on said electrophotographic photosensitive member 111, said developing roller 105b container therein a magnetic flux generating member 105a, and carries the developer on a peripheral surface thereof by a magnetic force generated by said magnetic flux tender rating member;

a developer regulating member 107 for regulating an amount of t developer carred on a peripheral surface of said developing roller 105b;

a blocking member 100 for blocking the developer from entering such a side of said developer regulating member 107 as is opposite from said developing roller 105b;

(b) feeding means 108 for feeding the recording material 114.

The modifications are summarized as follows:

The blocking member 100 is disposed in a developer relating member side of a line L2 which passes through a free end 107a1 of said developer regulating member 107 and which is parallel with a line L1 connecting a rotational center O of said developing roller 105b and a contact portion N between said developing roller 105b and said developer regulating member 107. The blocking member 100 is extended across a line L2 which passes through a free end 107a1 of said developer regulating member 107 and which is parallel with a line L1 connecting a rotational center O of said developing roller 105b and a contact portion N between said developing roller 105b and said developer regulating member 107 (FIG. 10(b)).

The blocking member 100 is extended in a longitudinal direction of said developer regulating member 107.

The developer regulating member 107 includes an elastic member elastically contacted to the peripheral surface of said developing roller 105b, and a metal plate supporting said elastic member, and said blocking member 100 is mounted to an inner wall of said developer accommodating portion 104a.

The blocking member 100 is mounted to the inner wall of said developer accommodating portion 104a by a double coated tape, an adhesive material and a screw.

The blocking member 100 prevents the developer from entering in the region S1 where the magnetic flux density provided by the magnetic pole of said magnetic flux generating member 105a is not less than 30 mT.

an outer surface of said blocking member 100 is disposed in the region S1 where the magnetic flux density provided by the magnetic pole of said magnetic flux generating member 105a.

one of the magnetic poles of said magnetic flux generating member 105a is disposed downstream of a contact portion N meeting said developing roller 105b and said developer relating member in a rotational moving direction of said developing roller 105b.

The blocking member 100 is of electroconductive material, and a remaining amount of the developer can be detected by the main assembly 101 of the apparatus 119 by transmitting to the main assembly 101 an electric signal in accordance with an electrostatic capacity provided between said blocking member 100 and said developing roller 105b when a voltage is applied to said developing roller 105b.

As described in the foregoing, according to the present invention, the developer is prevented from entering the side of the developer regulating member which is remote from the developing roller. Accordingly, the developer can be consumed efficiently.

While the invention has been described with reference to the structures disclosed herein, it is not confined to the details set forth and this application is intended to cover such modifications or changes as may come within the purpose of the improvements or the scope of the following claims.

What is claimed is:

1. A developing device for developing an electrostatic latent image formed on electrophotographic photosensitive member, said device comprising:

a developer accommodating portion for accommodating a magnetic developer;

a developing roller for developing with the developer the electrostatic latent image formed on said electrophotographic photosensitive member, said developing roller containing therein a magnetic flux generating member which is effective to generate a magnetic force by which the developer is carried on a peripheral surface of said developing roller;

a developer regulating member for regulating an amount of the developer carried on the peripheral surface of said developing roller; and a blocking member for blocking the developer from entering such a side of said developer regulating member as is opposite from said developing roller.

2. A device according to claim 1, wherein said blocking member is disposed in a developer regulating member side of a line which passes through a free end of said developer regulating member and which is parallel with a line connecting a rotational center of said developing roller and a contact portion between said developing roller and said developer regulating member.

3. A device according to claim 1, wherein said blocking member is extended across a line which passes through a free end of said developer regulating member and which is parallel with a line connecting a rotational center of said developing roller and a contact portion between said developing roller and said developing regulating member, and wherein the line extending between a region in which said developer regulating member exists and a region in which said developer regulating member does not exist.

4. A device according to claim 1, 2, or 3, wherein said blocking member is extended in a longitudinal direction of said developer regulating member.

5. A device according to claim 1, 2, or 3, wherein said developer regulating member includes an elastic member elastically contacted to the peripheral surface of said developing roller, and a metal plate supporting said elastic member, and said blocking member is mounted to an inner wall of said developer accommodating portion.

6. A device according to claim 5, wherein said blocking member is mounted to the inner wall of said developer accommodating portion by a double coated tape, an adhesive material and a screw.

7. A device according to claim 1, 2, or 3, wherein said blocking member prevents the developer from entering in the region where the magnetic flux density provided by the magnetic pole of said magnetic flux generating member is not less than 30 mT.

8. A device according to claim 1, 2, or 3, wherein an outer surface of said blocking member is disposed in the region where the magnetic flux density provided by the magnetic pole of said magnetic flux generating member is not more than 20 mT.

9. A device according to claim 1, 2, or 3, wherein one of the magnetic poles of said magnetic flux generating member is disposed downstream of a contact portion where said developing roller and said developer regulating member are contacted to each other in a rotational moving direction of said developing roller.

10. A device according to claim 1 or 3, wherein said blocking member is of electroconductive material, and a remaining amount of the developer can be detected by a main assembly of the apparatus by transmitting to the main assembly an electric signal in accordance with an electrostatic capacity provided between said blocking member and said developing roller when a voltage is applied to said developing roller.

11. A process cartridge detachably mountable to a main assembly of one electrophotographic image forming apparatus, comprising:

an electrophotographic photosensitive member;

a developer accommodating portion for accommodating a magnetic developer;

a developing roller for developing with the developer an electrostatic latent image formed on said electrophotographic photosensitive member, said developing roller containing therein a magnetic flux generating member, and carries the developer on a peripheral surface thereof by a magnetic force generated by said magnetic flux generating member;

a developer regulating member for regulating an amount of the developer carried on the peripheral surface of said developing roller; and a blocking member for blocking the developer from entering such a side of said developer regulating member as is opposite from said developing roller.

12. A process cartridge according to claim 11, wherein said blocking member is disposed in a developer regulating member side of a line which passes through a free end of said developer regulating member and which is parallel with a line connecting a rotational center of said developing roller and a contact portion between said developing roller and said developer regulating member.

13. A process cartridge according to claim 11, wherein said blocking member is extended across a line which passes through a free end of said developer regulating member and which is parallel with a line connecting a rotational center of said developing roller and a contact portion between said developing roller and said developer regulating member, and wherein the line extending between a region in which said developer regulating member exists and a region in which said developer regulating member does not exist.

14. A process cartridge according to claim 11, 12, or 13, wherein said blocking member is extended in a longitudinal direction of said developer regulating member.

15. A process cartridge according to claim 14, wherein said developer regulating member includes an elastic member elastically contacted to the peripheral surface of said developing roller, and a metal plate supporting said elastic member, and said blocking member is mounted to an inner wall of said developer accommodating portion.

16. A process cartridge according to claim 11, 12, or 13, wherein said developer regulating member includes an elastic member elastically contacted to the peripheral surface of said developing roller, and a metal plate supporting said elastic member, and said blocking member is mounted to an inner wall of said developer accommodating portion.

17. A process cartridge according to claim 16, wherein said blocking member is mounted to the inner wall of said developer accommodating portion by a double coated tape, an adhesive material and a screw.

18. A process cartridge according to claim 11, 12, or 13, wherein said blocking member prevents the developer from entering in the region where the magnetic flux density provided by the magnetic pole of said magnetic flux generating member is not less than 30 mT.

19. A process cartridge according to claim 11, 12, or 13, wherein an outer surface of said blocking member is disposed in the region where the magnetic flux density provided by the magnetic pole of said magnetic flux generating member is not more than 20 mT.

20. A process cartridge according to claim 11, 12, or 13, wherein one of the magnetic poles of said magnetic flux generating member is disposed downstream of a contact portion where said developing roller and said developer regulating member are contacted to each other in a rotational moving direction of said developing roller.

21. A process cartridge according to claim 11 or 13, wherein said blocking member is of electroconductive material, and a remaining amount of the developer can be detected by the main assembly of the apparatus by transmitting to the main assembly an electric signal in accordance with an electrostatic capacity provided between said blocking member and said developing roller when a voltage is applied to said developing roller.

22. An electrophotographic image forming apparatus for forming an image on a recording material, comprising:

an electrophotographic photosensitive member;

a developing device for developing an electrostatic latent image on said electrophotographic photosensitive member, said developing device including;

a developer accommodating portion for accommodating a magnetic developer;

a developing roller for developing with the developer the electrostatic latent image formed on said electrophotographic photosensitive member, said developing roller containing therein a magnetic flux generating member, and carries the developer on a peripheral surface thereof by a magnetic force generated by said magnetic flux generating member;

a developer regulating member for regulating an amount of the developer carried on the peripheral surface of said developing roller; and a blocking member for blocking the developer from entering such a side of said developer regulating member as is opposite from said developing roller; and feeding means for feeding the recording material.

23. A main assembly of an electrophotographic image forming apparatus for forming an image on a recording material, to which a process cartridge is detachably mountable, said apparatus comprising:

a mounting portion for mounting said process cartridge, said process cartridge including;

a developer accommodating portion for accommodating a magnetic developer;

a developing roller for developing with the developer an electrostatic latent image formed on said electrophotographic photosensitive member, said developing roller containing therein a magnetic flux generating member, and carries the developer on a peripheral surface thereof by a magnetic force generated by said magnetic flux generating member;

a developer regulating member for regulating an amount of the developer carried on a peripheral surface of said developing roller;

a blocking member for blocking the developer from entering such a side of said developer regulating member as is opposite from said developing roller;

feeding means for feeding the recording material.

\* \* \* \* \*

UNITED STATES PATENT AND TRADEMARK OFFICE
CERTIFICATE OF CORRECTION

PATENT NO. : 6,466,759 B1
DATED : October 15, 2002
INVENTOR(S) : Hideki Matsumoto It is certified that error appears in the above-identified patent and that said Letters Patent is hereby corrected as shown below:

Column 2,
Line 46, "intention" should read -- invention --.

Column 4,
Line 14, "V1parts" should read -- V1 parts --; and
Line 32, "and" should read -- an --.

Column 5,
Line 43, "of" (second occurrence) should read -- to --.

Column 7,
Line 10, "FIGS. 7(1) - 7(6)" should read -- FIGS. 7(0) - 7(6) --; and
Line 37, "print ratio4%" should read -- 4% print ratio --.

Column 8,
Line 15, "remarkably reduces." should read -- is remarkably reduced. --; and
Line 37, "bedside" should read -- backside --.

Column 10,
Line 37, "necessarily, the entire" should read -- necessarily cover the entirety --; and
Line 38, "year" should be deleted.

Column 11,
Line 1, "above-described," should read -- foregoing discussion --;
Line 2, "as photosensitive" should read -- as a photosensitive --;
Line 26, "charged" should read -- charge --; and
Line 50, "they tied" should read -- a type --.

Column 12,
Line 32, "such a" should be deleted.

Column 13,
Line 28, "container" should read -- containing --;
Line 33, "t" should read -- the --;
Line 56, "container" should read -- containing --; and
Line 62, "t" should read -- the --.

UNITED STATES PATENT AND TRADEMARK OFFICE
CERTIFICATE OF CORRECTION

PATENT NO. : 6,466,759 B1
DATED : October 15, 2002
INVENTOR(S) : Hideki Matsumoto It is certified that error appears in the above-identified patent and that said Letters Patent is hereby corrected as shown below:

Column 14,
Line 32, "an" should read -- An --; and
Line 36, "one" should read -- One --.

Signed and Sealed this

Eleventh Day of March, 2003

JAMES E. ROGAN
*Director of the United States Patent and Trademark Office*